(No Model.)
W. H. SADLER.
LOOM TEMPLE.
No. 457,495. Patented Aug. 11, 1891.
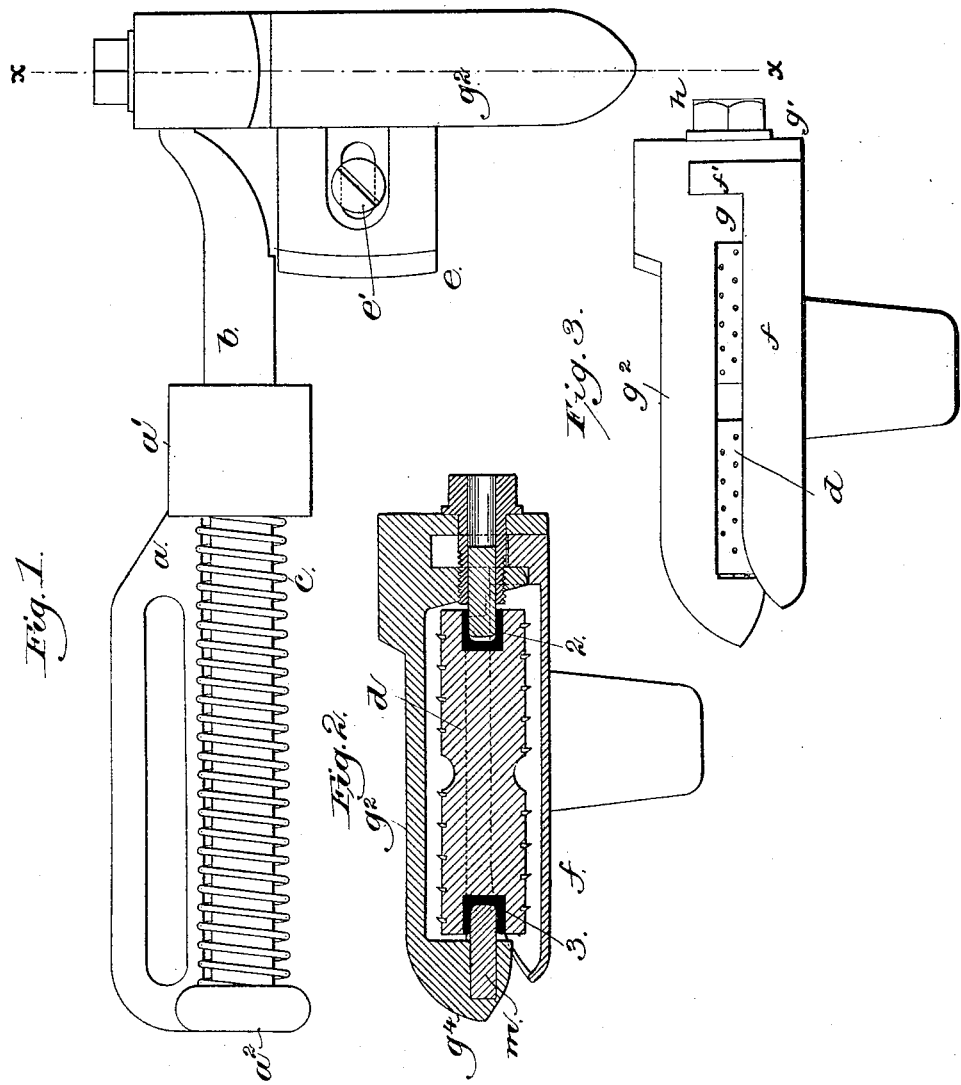
Witnesses.
John F. C. ...
Edward F. Allen.
Inventor:
William H. Sadler:
by Crosby & Gregory
attys.

UNITED STATES PATENT OFFICE.

WILLIAM H. SADLER, OF HOPEDALE, MASSACHUSETTS, ASSIGNOR TO THE DUTCHER TEMPLE COMPANY, OF SAME PLACE.

LOOM-TEMPLE.

SPECIFICATION forming part of Letters Patent No. 457,495, dated August 11, 1891.

Application filed August 30, 1890. Serial No. 363,524. (No model.)

*To all whom it may concern:*

Be it known that I, WILLIAM H. SADLER, of Hopedale, county of Worcester, State of Massachusetts, have invented an Improvement in Loom-Temples, of which the following description, in connection with the accompanying drawings, is a specification, like letters and figures on the drawings representing like parts.

This invention has for its object to strengthen and improve the construction of loom-temples, whereby the liability of the cap carrying the roller and the pod getting out of proper alignment is reduced to the minimum. The journals of the temple-roll are supported at opposite ends of the cap, instead of being supported one by the cap and the other by the pod of the temple, and to prevent the cap from springing under the strain of the cloth upon the roll I have connected the cap and pod together by means of a tongue-and-groove joint and by a screw, the screw, as herein represented, serving to contain one of the journals for the temple-roll.

Figure 1 is a top or plan view of a loom-temple embodying my invention. Fig. 2 is a section in the line $x$, and Fig. 3 is a front elevation, chiefly to show the tongue-and-groove connection between the cap and pod.

The temple-stand $a$, having the bearings $a'$ $a^2$, the shank $b$, the spring $c$, and the heel $e$, attached to the pod $f$ by the screw $e'$, are and may be all as usual. The pod $f$, forming, as shown, part of the shank, has a lug $f'$, which is embraced between the two ears $g$ $g'$ of the cap $g^2$, thus forming a tongue-and-groove connection, the ears $g'$ having screwed into it the screw $h$, represented as hollow and as provided at its inner end with a wooden or other journal, which enters, as shown, a vitreous bearing 2 in that end of the roller $d$ next to it. The body of the screw $h$ is extended through a hole in the ear $g'$ before it is screwed into the ear $g$, and a portion of the screw between the two ears sets into the open notch in the top of the lug $f'$. The extension of the screw through the two ears and the lug between them enables the two ears to be engaged firmly and rigidly to the lug, thus obviating any tendency of the cap and pod getting out of alignment due to strain exerted on the temple due to the passage of the cloth between the roller and pod, for in case the connection between the pod and cap carrying the roller becomes loose so as to permit wabbling or vibration the roller trembles and fails to run uniformly and properly, and the teeth are injured by striking the iron shell of the pod and the cloth is seriously damaged. The second journal $m$ for the opposite end of the roll is mounted in the thickened end $g^4$ of the pod, said journal entering, preferably, a vitreous bearing 3 in the end of the roll.

The employment of wooden journals and vitreous bearings obviates the use of oil; but broadly this is not new, and instead of the particular bearings shown for the roll I may employ any other usual form of bearings by which to support it without departing from this invention. Supporting the journals of the roll entirely in the cap, instead of partially in the cap and partially in the pod, is more advantageous in assembling, adjusting, and repairing the temple, and facilitates access to the the temple-roll and its removal when desired.

I claim—

1. In a loom-temple a pod and cap fitted together by two ears on one embracing a lug of the other, combined with a screw to unite and clamp the said ears and lug together and secure rigid alignment of the cap and pod, substantially as described.

2. In a loom-temple, a cap having journals for both ends of the temple-roll, combined with a pod, the said cap and pod having a tongue-and-groove connection, substantially as described, whereby the cap and pod are prevented from springing and the roll is kept in proper operative position with relation to the pod, substantially as described.

3. A temple-cap having journals for both ends of the temple-roll, a pod, the said cap and pod having a tongue-and-groove connection, substantially as described, combined with a screw containing one of the journals of the roll, substantially as described.

In testimony whereof I have signed my name to this specification in the presence of two subscribing witnesses.

WILLIAM H. SADLER.

Witnesses:
F. J. DUTCHER,
WM. W. KNIGHTS.